United States Patent [19]

McLennan

[11] Patent Number: 5,165,657
[45] Date of Patent: Nov. 24, 1992

[54] ACTUATOR FOR A ROTARY VALVE

[75] Inventor: William R. McLennan, Easton, Pa.

[73] Assignee: Victaulic Company of America, Easton, Pa.

[21] Appl. No.: 794,564

[22] Filed: Nov. 19, 1991

[51] Int. Cl.⁵ .......................................... F16K 31/528
[52] U.S. Cl. .................... 251/229; 74/18.2; 74/23; 74/57; 251/252; 251/335.3
[58] Field of Search ............... 74/25, 57, 424.8 R, 74/18.2, 23, 89; 251/56, 58, 229, 251, 252, 335.3

[56] References Cited

U.S. PATENT DOCUMENTS

| | | | |
|---|---|---|---|
| 1,155,576 | 10/1915 | Isley | 251/252 |
| 3,096,966 | 7/1963 | McFarland, Jr. | 251/335.3 |
| 3,399,695 | 9/1968 | Stehlin | 251/335.3 |
| 3,811,651 | 5/1974 | Gallagher et al. | 251/335.3 |
| 4,120,479 | 10/1978 | Thompson et al. | 251/56 |
| 4,293,117 | 10/1981 | Mueller | 251/252 |
| 4,350,322 | 9/1982 | Mueller | 251/252 |
| 4,436,280 | 3/1984 | Geisow | 251/56 |
| 4,468,002 | 8/1984 | Tremblay | 251/335.3 |
| 4,586,693 | 5/1986 | Tinner | 251/252 |
| 4,634,094 | 1/1987 | Geiser | 251/229 |
| 4,666,124 | 5/1987 | Giacobbi | 251/56 |
| 5,005,805 | 4/1991 | Morris et al. | 251/252 |

FOREIGN PATENT DOCUMENTS 2062871  7/1971  Fed. Rep. of Germany ...... 251/252

Primary Examiner—George L. Walton
Attorney, Agent, or Firm—Abelman Frayne & Schwab

[57] ABSTRACT

A hermetically-sealed actuator for a rotary valve is provided in which a first camming member is operative to move a stem axially, axial movement of the stem, in turn, producing rotation of a second rotary cam member that is operatively connected to rotate a valve spindle, the axially movable stem being hermetically sealed by a bellows mechanism, thus hermetically isolating the second camming member from the first camming member.

8 Claims, 2 Drawing Sheets

ACTUATOR FOR A ROTARY VALVE

FIELD OF THE INVENTION

This invention relates to an actuator for a rotary valve, and in particular to an actuator that is totally hermetically sealed, thus to provide a hermetically sealed rotary valve of particular use in the flow control of poisonous or noxious liquids or gases.

BACKGROUND OF THE INVENTION

Bellows-type seals are commonly employed for sealing axially movable valve members in axially movable plug or gate valves. Such bellows-type seals are entirely successful in such valves, in that the bellows-type seal is subjected to limited axial forces only, such forces being well within the handling capability of the selected bellows-type seal, those forces acting exclusively in directions axially of the bellows-type seal, and in the absence of bending or torsional forces applied to the bellows-type seal.

Such bellows-type seals also have been employed in the valve actuators of rotary-type valves, such as rotary plug valves, ball valves or butterfly valves. An example of such a rotary valve is to be found in Tremblay, U.S. Pat. No. 4,468,002, issued Aug. 28th, 1984. In the construction of that valve, a bearing, of necessity, must be provided between the rotary valve actuator and the bellows seal, in order to permit rotary movement of the valve actuator relative to the rotationally fixed bellows seal, the bellows seal itself being incapable of rotary movement. In the construction of this patent, the bearing is provided by a closed cap attached to one end of the bellows seal, the cap providing a bearing member that is interposed between the valve actuator and a valve actuating stem. The cap, upon actuation of the valve actuator, is caused to move along an orbital path, this in turn resulting in axial bending stresses being produced in the bellows-type seal, and, additionally, the imposition on the bellows-type seal of torsional forces arising from the frictional engagement of the bearing cap with the respective valve actuator and valve actuating spindle.

Such bending and torsional forces are objectionable, in that they promote fatigue failure of the bellows-type seal, which could have disastrous consequences to persons in the vicinity of the valve.

SUMMARY OF THE INVENTION

It is an object of this invention to provide a valve actuator for a rotary valve, which employs a bellows-type seal, but in which the bellows-type seal is totally isolated from any lateral displacement of the bellows-type seal, and also is totally isolated from any torsional forces produced by actuation of the valve actuator. The valve actuator of the present invention thus takes full advantage of the benefits of bellows-type seals, as employed in axially movable plug or gate valves, and employs those advantages in a valve actuator for a rotary valve, such as a rotary plug valve, ball valve or butterfly valve.

In order to achieve this advantage, the valve assembly of the present invention employs a mechanism that converts rotary movement of the valve actuator into an axial movement of the valve stem, the axial movement of the valve stem then being reconverted into a rotary motion of the rotary valve member of an associated rotary valve. In this manner, all of the advantages of a bellows-type seal can be provided in association with the axial movable valve stem, while at the same time, eliminating the need for rotary seals, and also, eliminating the imposition of any torsional or bending forces on the bellows-type seal.

According to the present invention, the hermetically sealed actuator for a rotary valve has a main body having a bore, and an axially movable valve actuator stem supported within said body for movement exclusively in a direction axially of said stem and of said bore, rotational movement of said stem relative to said body being precluded in its entirety.

Adjacent one of its ends, the stem is provided with a cam follower that cooperates with an axially fixed first rotary cam member having camming surfaces that cooperate with the cam follower on the stem, and which are operative to move the stem axially in response to rotational movement of the cam member relative to the stem.

At an axial position remote from the cam follower, the stem carries a camming member which cooperates with an axially fixed second rotary cam member, which has camming surfaces positioned in engagement with the camming member of the stem, those camming surfaces being operative to rotate the second rotary cam member in response to axial movement of the valve stem.

In this manner, a rotary movement of the first cam member causes a corresponding rotary movement of the second cam member, which is produced exclusively by an axial movement of the stem.

Having reduced movements of the stem exclusively to axial movements, a bellows seal can then be employed between the valve stem and the main body, the bellows seal being subjected exclusively to compressional and tensile loads to the total exclusion of bending and torsional loads.

In a preferred embodiment, the cam followers on the stem are provided by trunnions carried by the stem, and which at their outer ends are engaged in axially directed slots formed in the main body. The first rotary cam means is journalled within the main body for rotational movement thereto under the influence of camming rollers carried by the respective trunnions.

DESCRIPTION OF THE DRAWINGS

A preferred embodiment of the invention will now be described with reference to the accompanying drawings, in which.

DESCRIPTION OF THE PREFERRED EMBODIMENT

Figure 1:
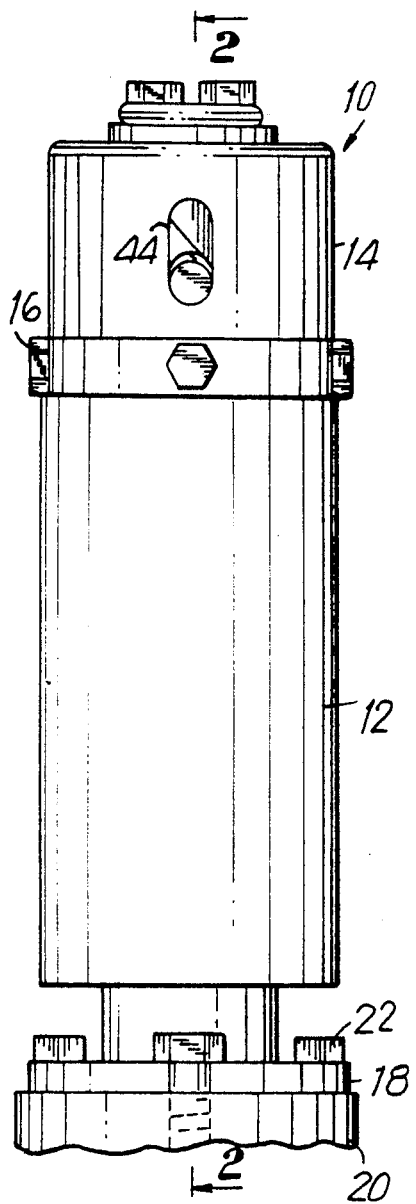
FIG. 1 is a front elevation of a valve actuator according to the present invention.
Figure 3:
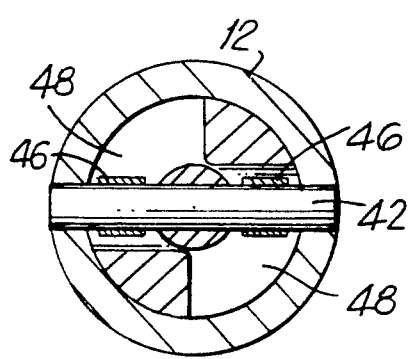
FIG. 3 is a cross-section taken on the line 3—3 of FIG. 2.

FIG. 1 illustrates a valve actuator according to the present invention generally at 10. As will be appreciated, the actual external appearance of the valve actuator can be varied in any desired manner to make it shorter or longer, rectangular, hexagonal, etc. However, in view of the internal structure of the valve actuator, a cylindrical form of the actuator in all probability will be found to be the most viable.

The actuator 10 includes a main body portion 12 having an upper portion 14 which is attached to the main body portion 12 by means of bolts 16. At its lower end, the main body 12 is provided with a flanged connector 18, whereby the valve actuator can be secured to the body of a conventional rotary valve 20 by means of bolts 22. The rotary valve 20 can be of any known type, including a rotary plug valve, a rotary ball valve, or a rotary butterfly valve, each of which includes a rotary valve member that cooperates with a valve seat, as is well known in the art.

Figure 2:
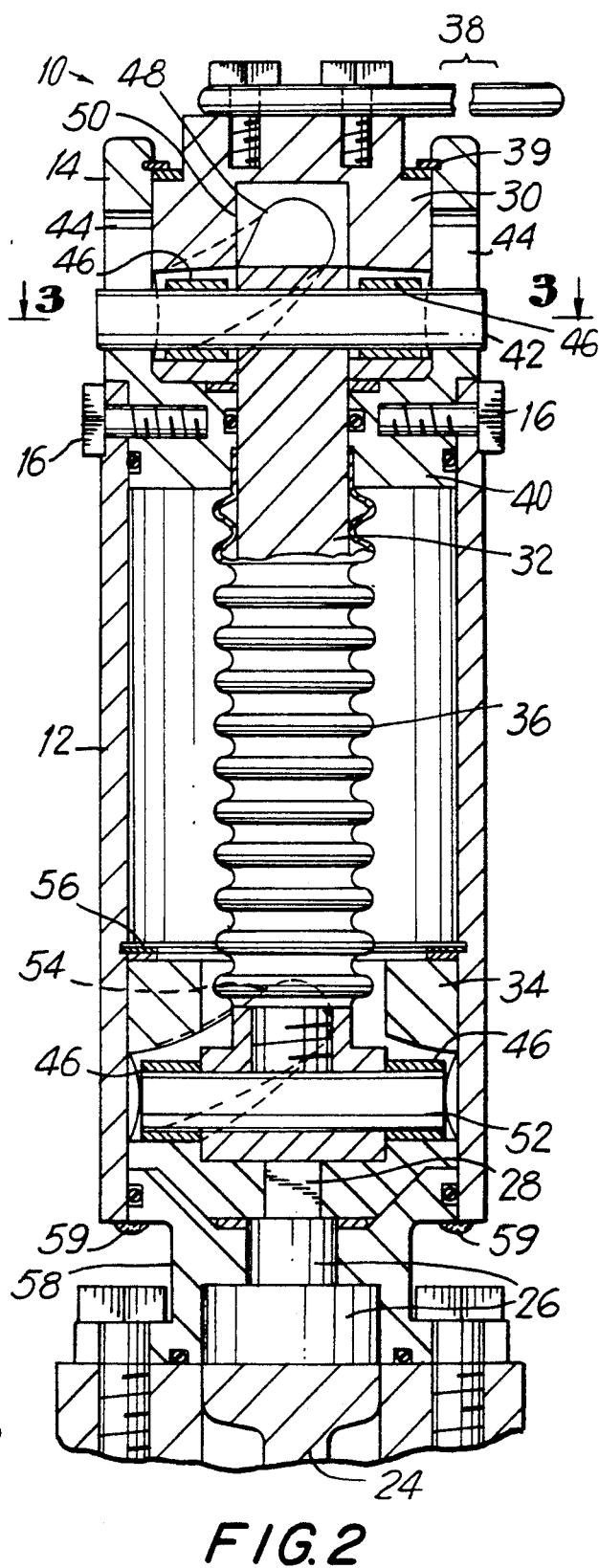
FIG. 2 is a cross-section taken on the line 2—2 of FIG. 1.

An upper portion of a rotary valve member is indicated at 24 in FIG. 2, the valve member 24 being attached to or integral with a cylindrical drive shaft 26 that terminates at its upper end in a squared key 28.

The actuating mechanism of the valve actuator is illustrated in FIG. 2, and comprises five major elements, those elements being a first camming member 30, an axially movable and rotationally fixed stem 32, a second rotary camming member 34, and, a bellows seal 36, each contained within the main body portion 12 and the upper body portion 14.

The first camming member 30 is supported within the upper body portion 14 for rotation relative to the upper body portion 14, the first camming member being held against axial movement relative to the upper body portion 14 by C-clips 39. At its upper end, the first camming member 30 is provided with some form of drive means, the drive means illustrated being a manually actuable handle 38 which is bolted to an upper surface of the first cam member 30. As will be appreciated, the handle 38 equally well could be replaced by a pneumatic, hydraulic or electric drive motor operating through an appropriate drive transmission.

The upper portion 14, as previously stated, is bolted at 16 to the main body portion 12. The upper body portion 14 thus rigidly attached to the main body portion 12 and is held immovable relative to the main body portion 12 both in axial and rotational directions. The upper body portion 14, at its lower end, terminates in an annular guide portion 14 having a central bore in which the axially movable stem 30 is journalled for axial movement. At its upper end, the stem 32 has a pin 42 rigidly attached thereto. The pin 42 extends laterally beyond each side of the stem 32 to provide trunnions that extend into slots 44 formed in the upper portion 14. The trunnions provided by the pin 42 carry anti-friction rollers 46, the anti-friction rollers 46 being positioned within a helical cam slot 48 formed in the first camming member 30.

As is common in the industry, and in order to provide what is commonly referred to as a quarter-turn valve, the helical cam slots 48 each have an arcuate annular extent slightly in excess of 90°.

The first camming member 30 has a central bore 50 in which the stem 32 is guided for axial sliding movement, this feature being preferable, but not essential, in that the stem 32 could be of square or other cross-section, in which event the upper end of the stem would be appropriately formed for it to move freely within the bore 50. The provision of the central bore 50 in the first cam member results in the helical cam slots 48 each being formed in an outer annular portion of the first camming member 30, the result being that the helical camming slots each form ramp cams for engagement with the anti-friction rollers 46. Thus, on rotation of the first camming member 30 through an angular extent of 90° by rotating the handle 38 in an appropriate direction [counterclockwise as related to FIG. 2] the ramp cams provided by the helical cam slots 48 act to pick up the anti-friction rollers 46, and, move those rollers together with the pin 42 and the stem 32 in an axially upwards direction, the stem 32 being guided for axial movement within the bore of the annular guide portion 40 of the upper body portion 14, at the bore 50 of the first camming member 30.

Figure 4:
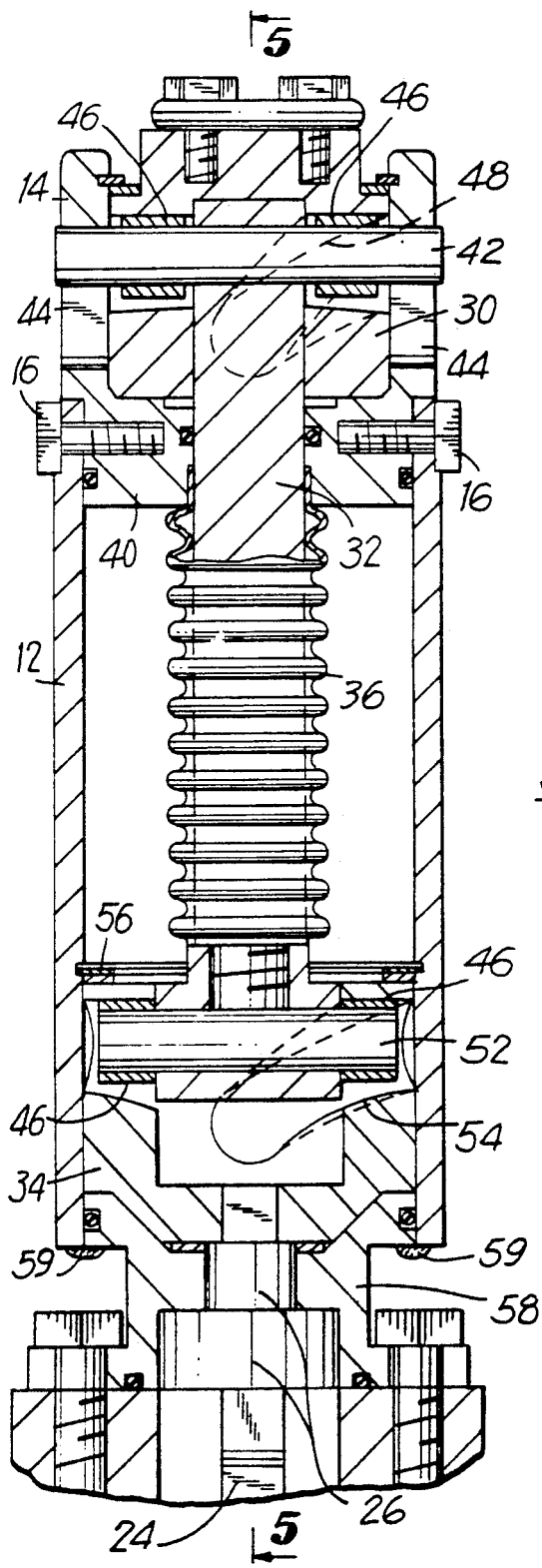
FIG. 4 is a view corresponding with FIG. 2, but showing the valve actuator in an opposite position of actuation.

Thus, it will be seen that a simple 90° turn of the handle 38 will result in the stem 32 being raised from its lowermost position as illustrated in FIG. 2 to its uppermost position as illustrated in FIG. 4, or, in the alternative, returned from the uppermost position shown in FIG. 4 to the lowermost position illustrated in FIG. 2.

At its lower end, the stem 32 is provided with a second pin 52 that extends transversely of the lower end of the stem 32, and which also is surrounded by anti-friction rollers 46. The second pin 52 does not extend through slots in the main body portion 12 in the manner of the upper pin 42, but instead, terminates within the main body 12. If desired, axially extending grooves can be provided in the interior wall of the main body 12, in which the outermost ends of the pin 52 are guided for movement axially of the body 12.

Figure 5:
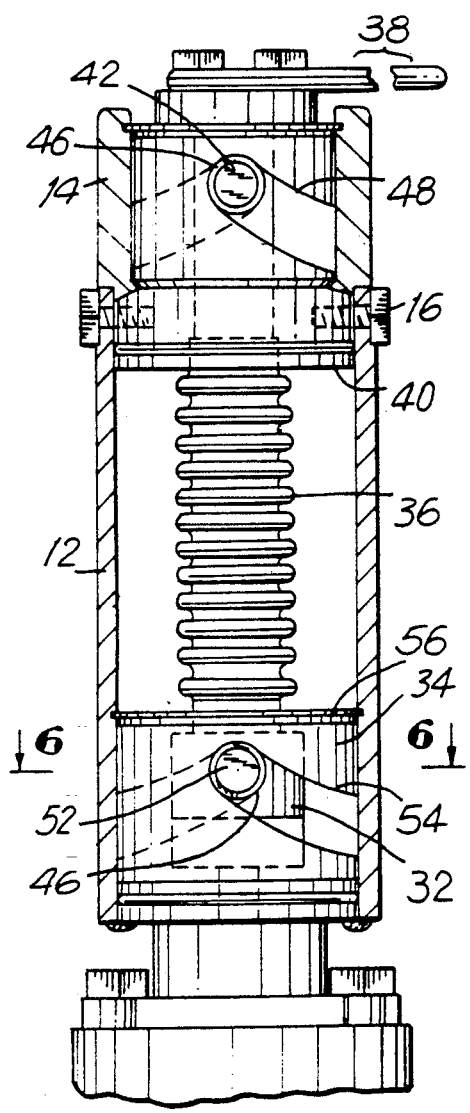
FIG. 5 is a cross-section taken on the line 5—5 of FIG. 4 and showing the respective rotary cams in elevation.
Figure 6:
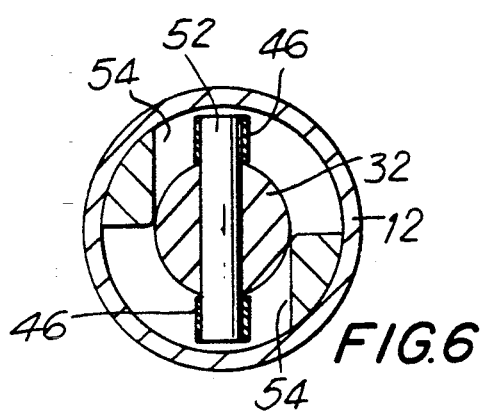
FIG. 6 is a cross-section taken on the line 6—6 of FIG. 5.

The opposite ends of the pin 52 and their surrounding anti-friction rollers 46 extend into helical camming slots 54, as more clearly illustrated in FIG. 5, in the second camming member 34. The second camming member 34 is journalled for rotation within the main body 12, and is free of any connection with the stem 32, other than at the points of contact of the rollers 46 with the helical cam slots 54. The second camming member 34 is restrained against movement axially within the main body 12 by a C-clip 56, the lower end of the second camming member 34 being in rotational sliding engagement with an annular closure member 58 provided at the lowermost end of the body portion 12. The lowermost portion of the second camming member 34 is provided centrally with a squared opening in which the key 28 is received, thus enabling rotary movement of the second camming member 34 to be transmitted directly to the shaft 26 of the rotary valve 24.

As illustrated, the annular closure member 58 can be secured to the main body portion by welds 59 or in any other convenient manner that provides a hermetic seal between the annular closure member 58 and the main body portion 12. As is illustrated, O-rings can be provided at strategic points in the assembly, further to insure the hermetic sealing of the interior of the main body portion 12.

In operation, the helical camming slots 54 produce the reverse effect to the camming slots 48, in that while rotation of the upper camming member 30 will cause raising or lowering of the stem 32, the camming slots 54 will produce rotation of the second camming member in the presence of axial movement of the stem 32. Thus, if the handle 38 is operated in a direction to open the valve, the stem 32 will be raised in an axial direction, and, in being so raised, will cause the second camming member 34 to rotate within the main body portion 12, that rotation, in turn, producing rotation of the valve member 24.

The bellows 36 extends concentrically of the stem 32, and, at its lower end is hermetically sealed, for example, by welding, to a lower portion of the stem 32. At its upper end, the bellows 36 is hermetically sealed to the annular guide portion 40, for example, by brazing of the outer surface of the bellows to the wall of the through bore in the annular guide portion 40.

In operation of the valve actuator, in the event that any noxious fluid or gas seeps axially of the shaft 26, any such seepage then becomes trapped within the main body portion 12, and, remains trapped within the main body portion 12, the interior of the main body portion 12 being hermetically sealed by the bellows 36.

Rotary movement of the stem 32 is precluded by the engagement of the outer ends of the pins 42 in the slots 44 of the upper body portion 14, the upper body portion 14 being non-rotatively held relative to the main body portion 12 by the bolts 16. Thus, despite substantial torsional forces that can act on the stem 32, the stem 32 is immobilized against rotation, this, in turn, relieving the bellows 36 of any bending and torsional forces, such as could cause accelerated deterioration of the bellows 36.

While the stem 32 has been illustrated in the drawings as being axially of substantial length, that length and the total height of the valve actuator could be very considerably shortened by moving the annular guide portion axially towards the second camming member 46, and, by appropriately shortening the main body 12 and the bellows 36, to result in an even more compact valve actuator, as may be desirable in the event that the valve actuator is power-driven instead of being manually actuated in the manner described above.

What is claimed is:

1. A hermetically sealed actuator for a rotary valve, comprising:
   a main body having a bore;
   an axially movable stem journalled within said body for movement exclusively in a direction axially of said stem and said bore and to the exclusion of rotary movement of said stem relative to said body, said stem having a first cam follower;
   an axially fixed first rotary cam member cooperating with said cam follower on said stem, and operative to move said stem axially in response to rotational movement of said cam member relative to said stem;
   a second cam follower carried by said stem at a position remote from said cam follower;
   an axially fixed second rotary cam means having cam surfaces in engagement with said second cam follower, said second rotary cam means being rotated in response to axial movement of said valve stem; and,
   a bellows-type seal surrounding said stem and extending axially between said stem and said main body, said seal disposed between said first and second cam members for hermetically isolating said first rotary cam member from said second rotary cam member whereby said bellows-type seal is subjected exclusively to axially directed forces.

2. The valve actuator of claim 1, in which said first rotary cam member is connected to a drive means for rotating said first rotary cam member.

3. The valve actuator of claim 2, in which said drive means is a manually actuable handle.

4. The valve actuator of claim 1, in which said rotary cam member is journalled in said main body for rotational movement within said main body to the exclusion of axial movement.

5. The valve actuator of claim 1, in which said second rotary cam member is journalled in said main body for rotational movement within said main body to the exclusion of axial movement relative to said main body.

6. The valve actuator of claim 1, in which said first and second rotary cam member each include helical ramp cam surfaces, cooperating, respectively, with said cam follower and said camming member of said stem.

7. The valve actuator of claim 1, including means for attaching said main body to a rotary valve with said second rotary cam member in rotary driving connection with a rotary valve spindle of said valve.

8. The valve actuator of claim 1, in which said first cam follower and said second cam follower of said stem each are provided by trunnions secured to said stem and extending perpendicular to the longitudinal axis of said stem.

* * * * *